Feb. 6, 1934.   E. H. MORROW ET AL   1,945,699
LUBRICATOR ATTACHMENT
Original Filed Dec. 22, 1930
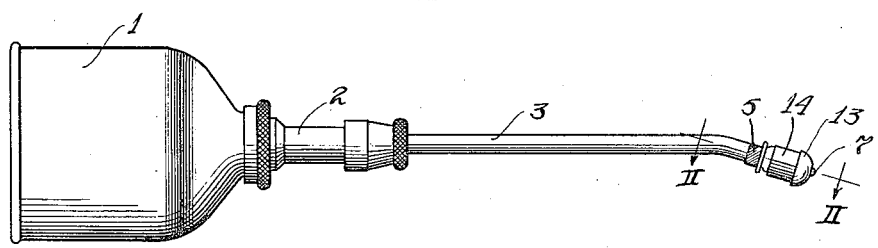
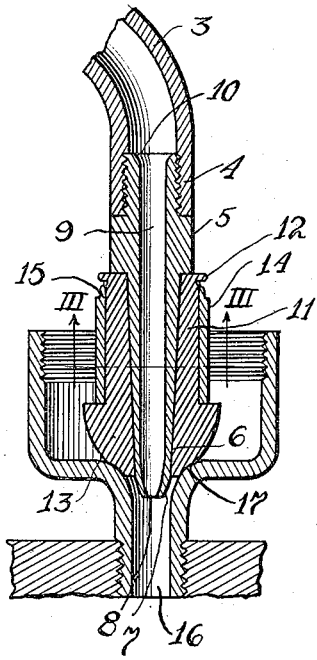
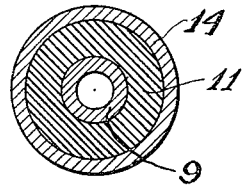
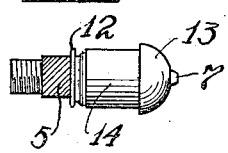
Inventors
Emmet H. Morrow and
John C. Morrow
by
Attys.

UNITED STATES PATENT OFFICE 1,945,699

LUBRICATOR ATTACHMENT

Emmet H. Morrow and John C. Morrow, Chicago, Ill., assignors to T. H. Gauthreaux, Chicago, Ill.

Application December 22, 1930, Serial No. 504,022
Renewed May 17, 1933

1 Claim. (Cl. 285—163)

This invention relates to a lubricator attachment and more particularly to one for application to the spout of the lubricator to provide an oil seal between the lubricator spout and oil holes or oil fittings for the purpose of aiding in the forcing of oil into the oil holes or other oil fittings generally.

Lubrication by the ordinary type of oil can consists in pressing the bottom of the can, whereby the oil enters the lubricating orifice by gravity and cannot be discharged under pressure into the oil orifices for the reason that there is no pressure tight contact between the lubricator spout and the lubricating orifice.

The present invention provides means for attachment to the spout of an oil lubricator, whereby the oil orifice is sealed by the attachment of the present invention and the oil may be forced into the oiling orifice under pressure. The attachment adapts itself readily to sealing contact with any usual type of oil receiving orifice, such as an oil hole, an oil fitting, or an oil cup.

An object of the present invention is to provide an end attachment for a lubricator spout which will effectively seal the connection between the spout and an oil hole or oil fitting simply by pressure of such attachment against such hole or fitting.

Another object of the invention is to provide an attachment for application to the spout of an oil lubricator wherein the attachment is provided with a base which will readily adjust itself to the oil opening and make a tight connection therewith to prevent the leakage of any oil while it is being forced into such opening and with the end of the oil discharge conduit extending beyond such attachment.

A further object of the invention is to provide an oil seal or attachment for use with the spouts of lubricators of maximum simplicity, efficiency, economy, and ease of operation, and which will effectively seal the connection between the lubricator spout and the oil orifice for application of oil under pressure to such orifice.

The above, other, and further objects of the invention will be apparent from the following description, accompanying drawing, and appended claim.

One embodiment of the invention is illustrated in the accompanying drawing and the views thereof are as follows:

Figure 1 is a side elevational view of the high pressure lubricator provided with an attachment embodying the present invention.

Figure 2 is an enlarged section through the illustrated form of attachment with a fragmental portion of the lubricator spout and showing the attachment in sealing engagement with an oil cup.

Figure 3 is an enlarged section taken substantially in the plane of line III—III of Figure 2.

Figure 4 is a side view of the illustrated form of the present invention.

The invention is illustrated in connection with a high pressure oiler such as that set forth in co-pending application, Serial No. 401,291, with the attachment of the present invention applied to the end of the spout of such oiler.

The lubricator as illustrated consists of the lubricator can 1, the neck 2 threaded to the reduced end of the body 1, and a spout 3. The outer end of the spout is internally threaded at 4.

The attachment forming the subject matter of the present invention includes a metallic tip having one end reduced in diameter and exteriorly threaded for engaging the threads 4 at the outer end of the spout 3. An intermediate enlarged knurled portion 5 and a nozzle portion 6 which is exteriorly tapered toward the discharge end of the same with the discharge end being rounded at 7, leaving a restricted discharge orifice at 8.

A sleeve 11 of resilient material such as rubber, rubber-like material or composition of such nature as will not be readily affected by oil, is applied about the tapering portion of the nozzle. The major portion of the sleeve 11 is substantially cylindrical and at its inner end is formed with a bead 12 and at its other end with an enlarged substantially semi-spherical head 13. The sleeve is applied over the nozzle so that the outer end of the head 13 lies inwardly of the end 7 of the nozzle. In other words, the end of the nozzle projects beyond the head of the sleeve 11.

Preferably, a metallic retaining ring 14 is arranged about the cylindrical portion of the sleeve 11 to prevent undue expansion thereof or possible breaking of the same. The inner end of the metallic sleeve 14 is reduced in thickness as at 15 for aiding in crimping the metallic sleeve against the resilient sleeve 11 to more effectively connect these parts.

The head 13 of the resilient sleeve makes tight contact with the lubricating orifice of almost any shape or construction.

Figure 2 illustrates the application of an oil can having an attachment of the present invention connected to the spout thereof, applied to the interior of an oil cup. The semi-spherical head 13 is pressed against the oil passage 16 of the cup and because of its shape and resiliency makes tight sealing contact at 17 between the lubricator spout and the cup. The discharge end of the nozzle 7 projects beyond the head 13 of the sleeve 11 and therefore, enters the lubricating orifice.

An attachment such as that illustrated and described applied to an oil orifice such as an oil cup readily seals the joint between such cup and lubricator spout so that when the pressure element of the lubricator is operated, oil is forced into the lubricating orifice under pressure. Lubrication may be continued as long as the lubricator is actuated with the assurance that no oil will escape between the spout and the oil fitting and with the further assurance that the joint between these members is sealed so that high pressure lubrication may take place and continue.

The advantage of an attachment of this character in connection with high pressure lubrication is that the joint is sealed merely by pressure of the attachment against the oil receiving orifice and without the use of special connections, such as screw threaded connection, pins, slots, and like connections.

The present invention lends itself very readily to high pressure lubrication for all kinds of oil orifices, so that a single lubricator may be advantageously used in applying high pressure lubrication to oil orifices of various and sundry kinds and characters.

The attachment of the present invention is inexpensive to manufacture and when an attachment has become worn or rendered ineffective for use, it may be discarded and a new one applied at very slight cost.

An attachment such as that of the present invention finds ready use in connection with the lubrication of machinery of various and sundry kinds and by reason of the formation of the oil seal between the lubricator and the oil fitting, it is possible to lubricate bearing surfaces with pressure lubrication which ordinarily would not be properly lubricated with the ordinary oil can or could not otherwise be lubricated without the application of special fittings and lubricators.

The invention has been described herein more or less precisely as to details, yet it is to be understood that the invention is not to be limited thereby as changes may be made in the arrangement and proportion of parts and equivalents may be substituted without departing from the spirit and scope of the invention.

We claim as our invention:

An attachment for application to the spout of a lubricator comprising a tip or nozzle member having one end threaded to engage a lubricator spout and the other end elongated and having a restricted discharge orifice therein, said tip having an enlargement adjacent the threaded end serving as an abutment against the spout end and also as engaging means for application and removal of the tip with respect to the spout, a sleeve of resilient material applied over the elongated end of the tip and moved into abutment with said enlargement, said sleeve when against said enlargement having its other end short of the discharge orifice in said tip member, the outer end of said sleeve being substantially semi-spherical for surface contact with an oil opening when said tip is applied to the same for lubrication purposes.

EMMET H. MORROW.
JOHN C. MORROW.